United States Patent [19]

Gattey et al.

[11] Patent Number: 5,469,505
[45] Date of Patent: Nov. 21, 1995

[54] COMMUNICATIONS HEADSET HAVING A BALL JOINT-MOUNTED RECEIVER ASSEMBLY

[75] Inventors: Phillip A. Gattey, Los Gatos; Wolfgang W. Jensen, Aptos, both of Calif.

[73] Assignee: ACS Wireless, Inc., Scotts Valley, Calif.

[21] Appl. No.: 378,060

[22] Filed: Jan. 25, 1995

Related U.S. Application Data

[63] Continuation of Ser. No. 191,360, Feb. 3, 1994, abandoned, which is a continuation of Ser. No. 910,698, Jul. 8, 1992, abandoned.

[51] Int. Cl.$^6$ ............................ H04M 1/00; H04R 25/00
[52] U.S. Cl. ........................ 379/430; 381/183; 381/187
[58] Field of Search ............................ 379/430; 381/183, 381/187, 128, 129, 192; 181/128, 129

[56] References Cited

U.S. PATENT DOCUMENTS

| | | | |
|---|---|---|---|
| 3,579,640 | 2/1970 | Beguin et al. | 381/183 |
| 4,027,113 | 5/1977 | Matsumoto et al. | 381/192 |
| 4,634,816 | 1/1987 | O'Malley et al. | 379/430 |

FOREIGN PATENT DOCUMENTS

| | | | |
|---|---|---|---|
| 1296160 | 11/1972 | United Kingdom | 381/187 |

*Primary Examiner*—Jeffery A. Hofsass
*Assistant Examiner*—Jack Chiang
*Attorney, Agent, or Firm*—Limbach & Limbach; Michael A. Stallman

[57] ABSTRACT

A communication headset is disclosed having a microphone for transmitting the user's voice and a receiver for transmitting audio signals into the user's ear. The headset includes a resilient, generally U-shaped headband, to be worn over the head, having a housing adjustably attached at one end thereof. A receiver assembly is mounted to the housing with a ball and socket type arrangement, allowing the receiver assembly to rotate axially and pivot in a spherical fashion with respect to the housing, thereby increasing comfort and acoustic coupling with any size or shape ear.

13 Claims, 4 Drawing Sheets

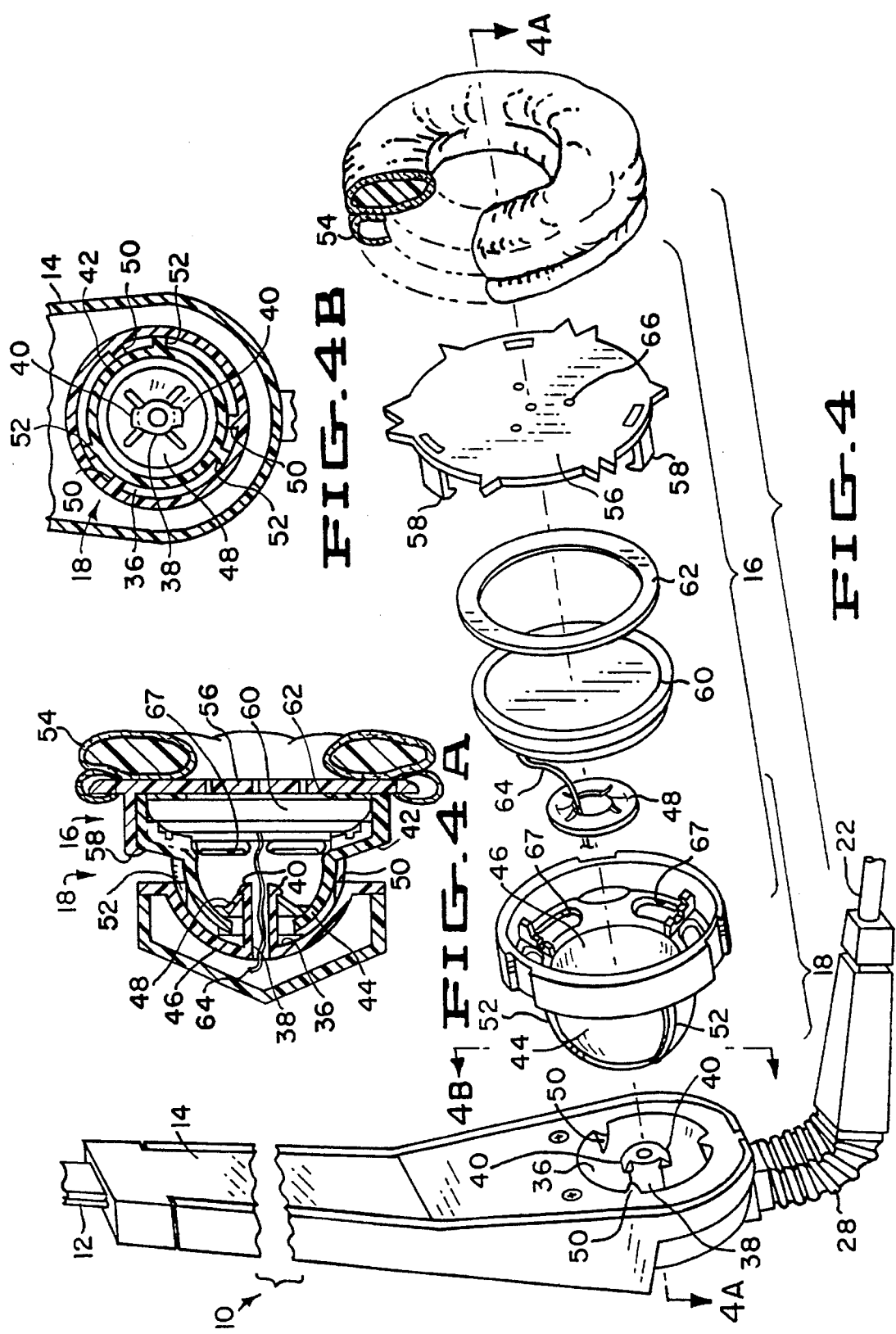

COMMUNICATIONS HEADSET HAVING A BALL JOINT-MOUNTED RECEIVER ASSEMBLY

This is a continuation of application Ser. No. 08/191,360, filed on Feb. 3, 1994, which is abandoned, which in turn is a file-wrapper-continuation of Ser. No. 0/910,698, filed on Jul. 8, 1992, which is abandoned.

BACKGROUND OF THE INVENTION

1. Field of the Invention

The present invention relates to communication headsets, in particular to headsets having a microphone for transmitting the user's voice and a receiver for transmitting audio signals into the user's ear.

2. Discussion of the Prior Art

A wide variety of communications headsets are known in the prior art. Many of the design features and configurations of these communications headsets are driven by the need to balance acoustical qualities with comfort and ease of use of the headset.

Binaural headsets (i.e., containing a receiver for both ears) are known having a band extending over the head or under the chin. Monaural headsets (having a receiver for only one ear) typically are supported on one ear and fit over, around or partially inside the ear. Alternatively, some monaural headsets include a headband with receiver and microphone assemblies on only one end of the headband. An example of this type of headset is taught in the applicants' U.S. Pat. No. 4,420,657, issued Dec. 13, 1983 (and Reexamination Certificate B1 4,420,657, issued Apr. 26, 1988.)

Acoustical signals from the receiver(s) of communication headsets enter the ear through an invasive ear tip placed in the auditory canal of the ear or directly from a speaker which is acoustically coupled with the outside of the ear. In any case, it is desirable to seal out background sounds and reduce attenuation of the acoustical wave between the receiver and the inner ear while still maintaining comfort, ease of use, versatility, and good hygiene.

Communication headsets convert the user's voice into electrical signals with a microphone which is typically placed in front of the user's mouth at the end of a microphone boom. The opposite end of the boom is connected to the receiver portion of the headset. Alternatively, the microphone boom may be hollow to carry the user's voice up the tube to a microphone mounted adjacent the receiver. Many headset designs offer a bendable microphone boom to allow the user to optimally position the end of the boom adjacent his or her mouth. This type of adjustment usually requires two hands. Additionally, because the boom may have some spring to it, the tip of the boom will have to be pushed beyond its desired position (sometimes into the users mouth) so that after the boom springs back, it is located close to the mouth. Eating or drinking while using a communications headset of the prior art often requires using two hands to bend the microphone boom away from the mouth and then again to reposition it, or removing the headset completely.

Some prior art headsets are designed to allow them to be worn on either ear. However, to optimize certain features, many headsets are limited to being worn only on the left or the right ear (with binaural headsets being limited to having the microphone boom located on the left or the right side). Such limiting features include noise cancelling microphones which must be oriented toward the user's mouth, and receiver configurations that are shaped to fit the angles and contours of a left ear or a right ear only.

SUMMARY OF THE INVENTION

Applicants have invented a communication headset which provides better sound quality and is more comfortable and convenient to use than the devices of the prior art.

Broadly stated, the present invention, to be described in greater detail below, is directed to a communication headset made up of a generally U-shaped, resilient head band fitting over the top of the user's head, a housing adjustably attached to at least one end of the headband, a receiver assembly connected to the housing and positioned over one ear of the user, and a microphone boom having a microphone located in its distal end positioned adjacent the user's mouth. The resilience of the head band biases the receiver assembly against the user's ear for stability.

In accordance with one aspect of the present invention, the headset includes a highly durable means for rotating and pivoting the receiver assembly, which includes a speaker, in a spherical fashion with respect to the housing, resulting in better acoustical coupling with the ear, and a more comfortable fit for any size or shape of ear.

In accordance with another aspect of the present invention, the headset includes a universal joint connecting the microphone boom to the housing. This arrangement allows the headset to be worn on either ear while keeping a noise cancelling microphone oriented in the proper direction, towards the user's mouth. The universal joint also allows the user to swing the microphone boom away from his or her face, for instance when eating or drinking, and then quickly and easily return the boom to its proper position with one finger.

All of the features of the present headset are designed to be self-explanatory to allow intuitive use. A user unfamiliar with communication headsets can quickly and easily situate the headset on either side of his or her head and instantly benefit from the improvements incorporated therein.

BRIEF DESCRIPTION OF THE DRAWINGS

FIG. 4 is an enlarged partial pictorial view of the headset with the receiver assembly exploded.

FIG. 4a is a cross-sectional view of the receiver assembly taken along line 4a—4a in FIG. 4.

FIG. 4b is a cross-sectional view of the receiver assembly taken along line 4b—4b in FIG. 4.

DETAILED DESCRIPTION OF THE PREFERRED EMBODIMENTS

Figure 1:
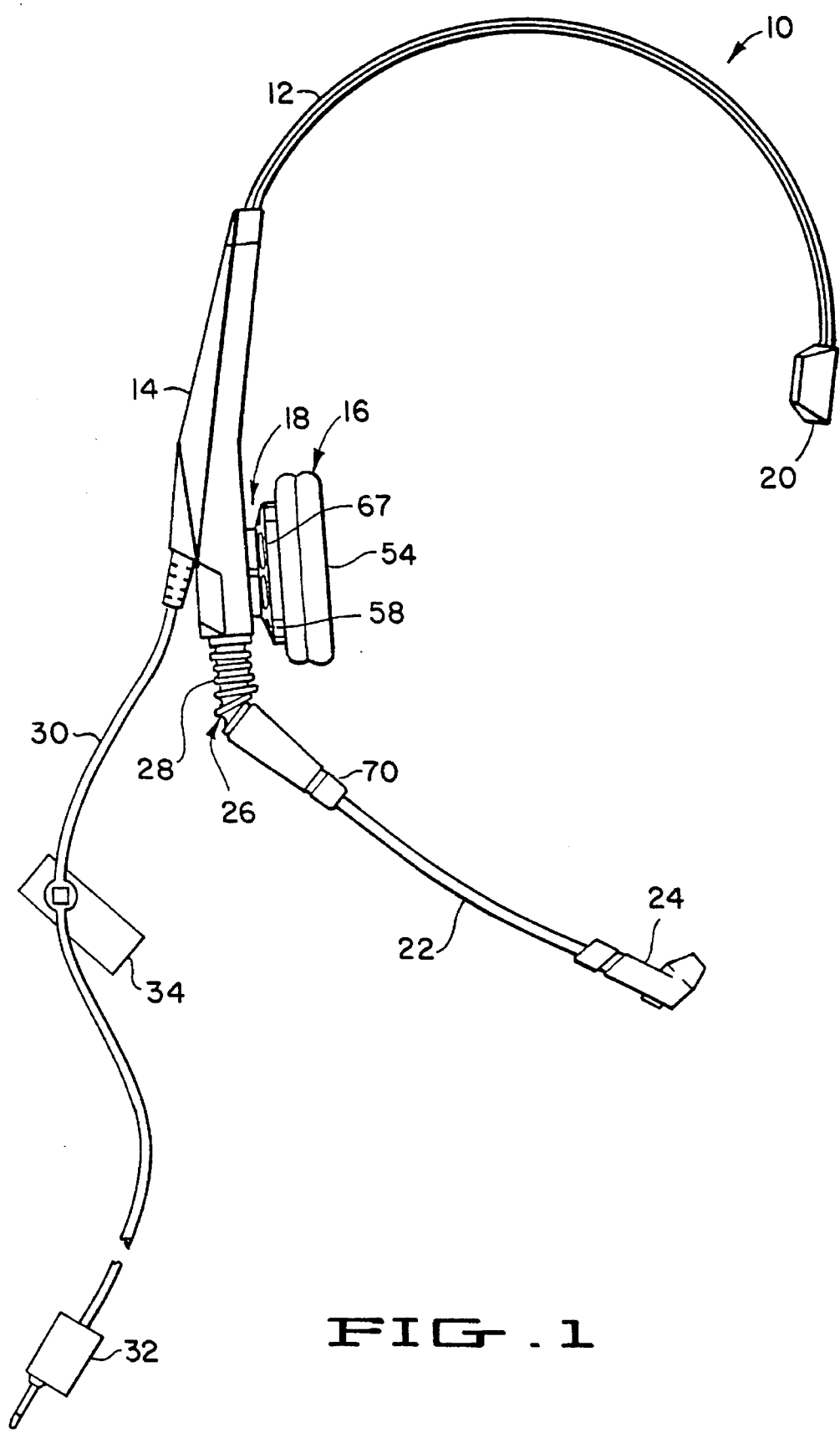
FIG. 1 is a front elevation view of the monaural configuration of the inventive headset.
Figure 2:
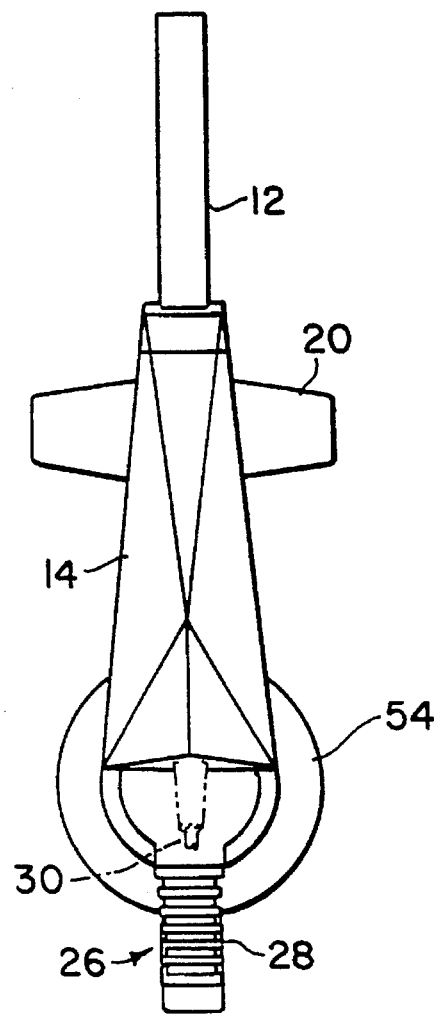
FIG. 2 is a side elevation view of FIG. 1 taken from the housing side of the headset.
Figure 3:
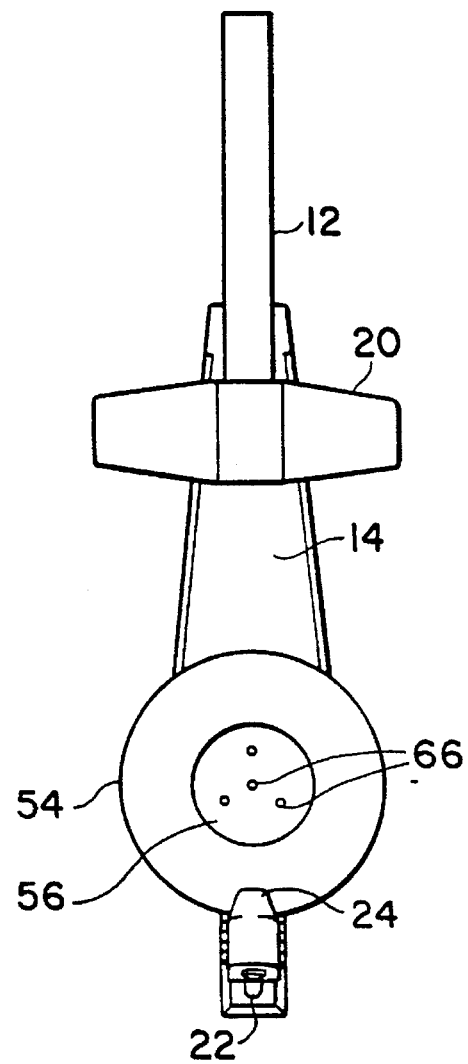
FIG. 3 is an opposite side elevation view of FIG. 1 taken from the stabilizing member side of the headset.

Referring to FIG. 1, the headset 10 of the present invention includes a resilient headband 12 that fits over the top of the users head. A housing 14 is adjustably connected to one end of the resilient headband 12 through a ratcheting or detent device, not shown, inside the housing 14. A padded receiver assembly 16 is pivotally attached to the housing 14 by way of a ball and socket type spherical joint 18. An arcuate stabilizing member 20 is rigidly attached to the other end of the headband 12 opposite the housing 14. The resilient head band 12 biases the stabilizing member 20 and the receiver assembly 16 towards each other such that when the headset 10 is worn, a slight pressure from the stabilizing member 20 and the receiver assembly 16 on the user's head acting in conjunction with the close fitting curve of the head band 12 serves to hold the headset 10 firmly in place on the user's head.

A microphone boom 22, having a microphone 24 located at its distal end, is attached at its proximal end to the bottom of the housing 14 with a universal joint 26. The universal joint 26 contains two mutually perpendicular pivot axes, each axis having a range of motion of at least 180 degrees, thus permitting three dimensional motion of the microphone 24 at the opposite end of the boom 22. A flexible bellows 28 covers the universal joint 26.

The microphone boom 22 is bendable, allowing the user to make the boom 22 curved and to further position the microphone 24 for optimal operation. A low durometer material is used for boom 22 to help acoustically isolate microphone 24 from receiver assembly 16.

The headset 10 is connected to communication equipment, such as a telephone, by way of a cable 30 which connects the circuitry, not shown, inside the housing 14 to a connector 32 for engagement with the communication equipment. A clip 34 is provided on the cable 30 for securing the cable 30 to the clothing of the user.

The details of the receiver assembly 16 and ball joint 18 are shown in FIGS. 4, 4a, and 4b. Housing 14, such as of ABS Cycolac T grade plastic, G.E. #4500, has a spherical recess 36 molded into its surface facing the inside of headband 12. Protruding from the middle of the surface of the spherical recess 36 is a hollow stem 38 having retaining barbs 40 on its distal end. A speaker shell 42, such as of the same ABS, has a thin spherical portion 44 for insertion into spherical recess 36. Hollow stem 38 extends through a central hole 46 in the thin spherical portion 44. Speaker shell 42 is pivotally and rotationally retained by housing 14 when retaining clip 48, such as of Nylon 6/6, engages retaining barbs 40 on hollow stem 38 and contacts the concave surface of the thin spherical portion 44. The convex surface of spherical portion 44 contacts three raised pads 50 formed on spherical recess 36.

The above arrangement permits limited spherical and rotational movement between speaker shell 42 and housing 14. The range of spherical pivoting motion between the two parts is limited by the outer portion of the speaker shell 42 contacting the housing 14. The range of rotational motion between speaker shell 42 and housing 14 is limited by exterior ribs 52 contacting pads 50, as best shown in FIG. 4b. In the preferred embodiment, the spherical pivoting motion of the ball joint 18 is limited to about ±15° in any direction, and the axial rotational motion is limited to about 110°. Axial rotation of the receiver assembly 16 is limited to protect speaker wires 64 (discussed below) from being stressed by over twisting.

Other embodiments (not shown) can be envisioned employing the same basic structure described above. For instance, pads 50 and ribs 52 could be reversed (i.e., the pads 50 being located on the receiver assembly 16 and the ribs 52 being located on the housing 14) and/or the convex and concave surfaces could be reversed (i.e., the convex surface being located on the housing 14 and the concave surface being located on the exterior of the receiver assembly 16.)

A soft, annular ear pad 54, such as of imitation leather, is fitted over shell cover 56. Shell cover 56 contains three fastening hooks 58 around its perimeter for attaching cover 56 to speaker shell 42. Speaker 60 is firmly sandwiched between cover 56 and shell 42. Resilient ring 62 and a similar ring (not shown) affixed to the back side of the speaker 60, serve to dampen vibrations from the speaker 60 and firmly shock mount the speaker 60 within the receiver assembly 16.

Speaker wires 64 electrically connect speaker 60 to circuitry (not shown) in housing 14 by passing through hollow stem 38. Holes 66 are provided in cover 56 to acoustically couple speaker 60 with the ear of the headset user. Holes 67 are also provided in the rear of shell 42 to provide acoustic relief to the generally closed speaker enclosure.

The entire receiver assembly 16 is able to spherically pivot and rotate to comfortably fit over any size or shape ear. Ear pad 54 further allows the receiver assembly 16 to conform to the individual's ear to provide a secure, comfortable fit and better acoustical coupling between the speaker 60 and the auditory canal of the user's ear. Low friction in the ball joint 18, even under compression, allows the receiver assembly 16 to rotate and pivot easily, ensuring that it seats properly and comfortably over the ear, and thereby providing optimal alignment between the speaker 60 and the ear.

The receiver assembly 16 is durable because retaining clip 48 prevents the ball joint 18 from being forced apart. Retaining barbs 40 are segmented rather than being continuous around the distal end of stem 38 to allow retaining clip 48 to be removed for disassembly of the receiver assembly 16, if necessary.

Figures 5, 6:
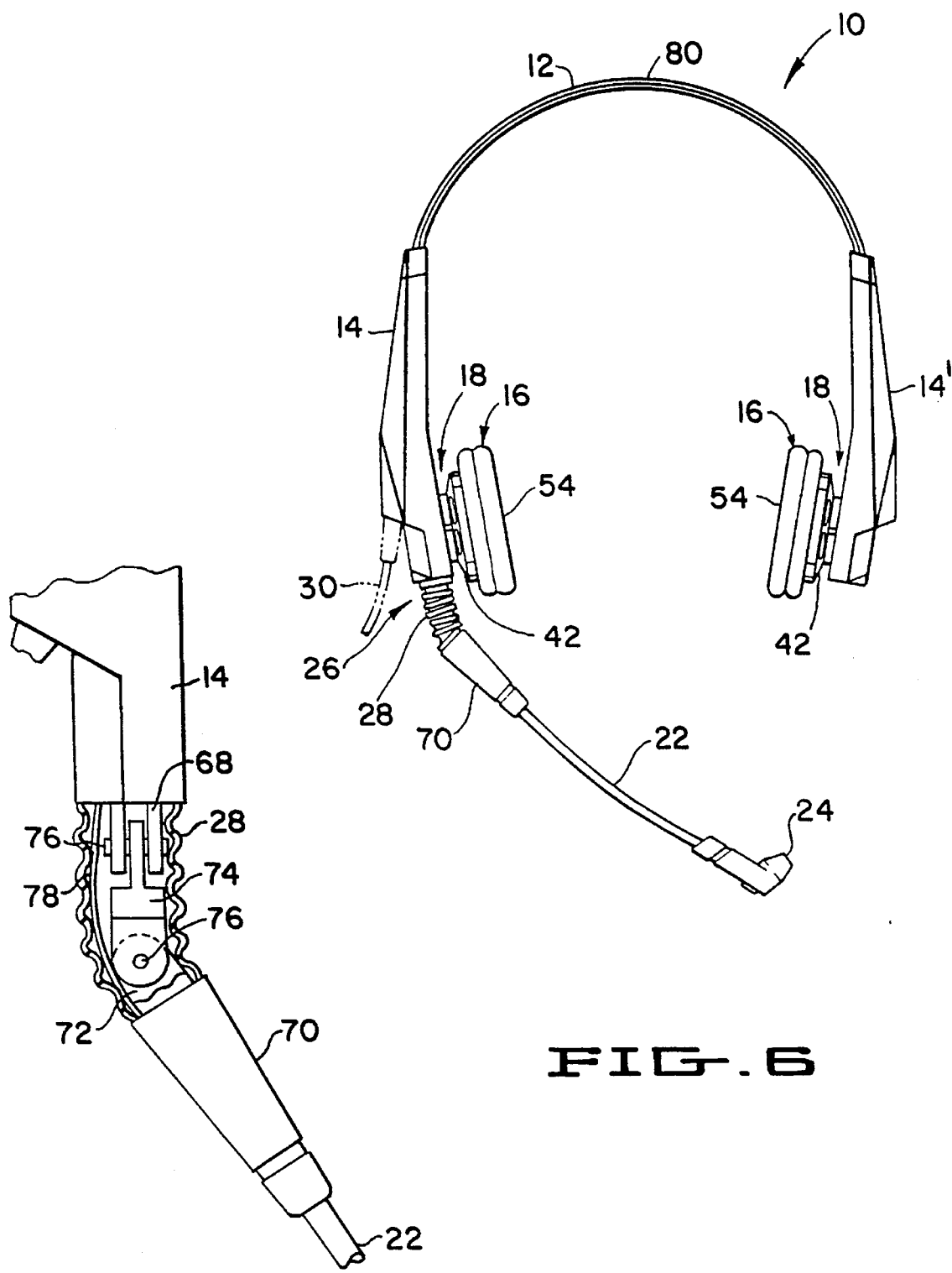
FIG. 5 is an enlarged partial fragmentary view of the microphone boom universal joint.
FIG. 6 is a front elevation view of the binaural configuration of the inventive headset.

The details of the universal joint 26 are shown in FIG. 5. Housing 14 includes a slotted member 68 on its lower end. The proximal end 70 of microphone boom 22 includes a similar slotted member 72. Intermediate member 74, such as of PVC, 95 Durometer Shore A, contains a blade-like segment at each end. The two blade-like segments are perpendicular to each other and lie on the axis of the intermediate member 74. Each of the slotted members 68 and 72 receives one of the segments of the intermediate member 74 and is pivotally attached thereto by a rivet 76. Microphone wires 78 run from the microphone 24 at the end of the microphone boom 22, alongside the universal joint 26, and into the housing 14. Ribs (not shown) formed around the base of slotted members 68 and 72 retain a flexible bellows 28 (shown in other figures) in position covering the universal joint 26 and wires 78.

The above universal joint arrangement allows the user of the headset 10 to easily position the microphone 24 in front of his or her mouth. To adjust the headset 10 for either left or right ear use, the microphone boom 22 is pivoted about rivet 76 in slotted member 68 to position the microphone 24 to one side of the head band 12. In the preferred embodiment, a noise cancelling microphone is used and must be properly oriented towards the users mouth. The above pivot axis allows the microphone 24 to be moved front to back (for left or right ear configuration) while keeping the microphone 24 properly oriented. This pivot axis also allows for the height adjustment of the microphone 24. The pivot axis formed by the rivet 76 through slotted member 72 allows the user to swing the microphone 24 toward or away from his or her face. This action may be needed repetitively, for instance, when the user is sipping coffee, and may easily be accomplished with one finger.

FIG. 6 shows a bi-aural embodiment of the present invention. In this configuration, the stabilizing member 20, described in the monaural embodiment above, is replaced by a second adjustable housing 14'. This second housing 14' accommodates a second active receiver assembly 16 mounted to the housing 14' by a second spherical ball joint 18, and electrically connected with circuitry (not shown) inside the first housing 14 by cable 80. The second ball joint 18 operates in an identical manner to the first. Cable 80 is captivated by a molded channel that runs along one edge of the head band 12. The second housing 14' does not support a microphone boom assembly (22, 24, 26 & 28), cable 30, or associated internal circuitry (not shown), but is otherwise identical to the first housing 14. As in the monaural configuration, the universal joint 26 and ball joints 18 make the headset 10 reversible so that the microphone assembly (22, 24, 26 & 28) may be worn on either the left or the right side.

It is to be understood that the present invention is not limited to the sole embodiment described above and illustrated herein, but encompasses any and all variations falling within the scope of the appended claims.

What is claimed as the invention is:

1. A voice communication headset comprising:

a generally U-shaped, resilient head band having a first end and a second end;

a housing attached to said first end of said head band, said housing including a pair of opposed side walls and wherein a concave spherical surface is formed in one side wall thereof, said concave surface projecting inwardly towards the other side wall, said housing further including a stem fixedly attached thereto and projecting outwardly from said concave spherical surface;

a receiver assembly, including a transducer for converting electrical signals into audible sound waves, said receiver assembly further including a receiver cup having an outermost rear wall, said rear wall including an outwardly projecting convex spherical surface slidably mating with the concave surface of said housing, said convex surface further including an aperture for receiving the stem of said housing, with dimensions of the aperture being larger than the cross-sectional dimensions of the stem; and a retainer attached to a distal end of said stem, wherein said retainer is larger than the aperture and slidably contacts the inner spherical surface of said receiver assembly to retain said receiver assembly on said housing and maintain engagement between the mating concave and convex spherical surfaces while allowing relative sliding motion therebetween, said receiver assembly cooperating with said housing, stem and retainer to define a ball and socket type joint, said joint allowing limited axial rotation and spherical pivoting of said receiver assembly with respect to said housing.

2. The voice communication headset recited in claim 1, further comprising securing means attached to said second end of said head band, said securing means being biased against a user's head above one ear by said head band thereby securing said headset on the user's head.

3. The voice communication headset recited in claim 1, wherein said concave surface is discontinuous and is formed by at least three pads on said housing.

4. The voice communication headset recited in claim 3, wherein said receiver cup further comprises at least one longitudinal rib formed on said convex surface, said rib limiting said axial rotation by alternately contacting two of said pads.

5. The voice communication headset recited in claim 1, wherein said stem comprises a bore therethrough allowing conductors to pass from said receiver cup through said stem into said housing.

6. A headset as recited in claim 1 further including microphone boom having a proximal and a distal end, said proximal end being attached to said housing.

7. A headset as recited in claim 1 further including a stop means associated with said joint for limiting the axial rotation of said receiver assembly with respect to said housing through an angle of less than 360 degrees.

8. A headset as recited in claim 7 wherein the axial rotation of the receiver assembly is limited to 110 degrees.

9. A headset as recited in claim 7 wherein said stop means includes opposed projections formed in said joint.

10. A voice communication headset comprising:

a generally U-shaped, resilient head band having a first end and a second end;

a housing adjustably attached to said first end of said head band;

a microphone boom having a proximal and a distal end, said proximal end being attached to said housing; and a receiver assembly pivotally mounted to said housing with a ball and socket type joint, said joint allowing axial rotation and spherical pivoting of said receiver assembly with respect to said housing, said joint further comprising:

at least three pads forming a concave spherical surface in a recess of said housing, said concave surface having a center axis;

a receiver cup including a thin spherical portion having an interior surface, a complementary exterior surface, and a central hole therethrough, said exterior surface slidably mating with said pads;

a stem extending from said housing along the center axis of said concave spherical surface and passing through said central hole in said receiver cup;

retaining means located on a distal end of said stem for slidably contacting said interior surface, thereby captivating said receiver cup on said housing while allowing said axial rotation and spherical pivoting of said receiver assembly between said retaining means and said pads; and at least one longitudinal rib formed on said exterior surface, said rib limiting said axial rotation by alternately contacting two of said pads.

11. The voice communication headset recited in claim 10, wherein said retaining means comprises at least one barb on the distal end of said stem and a washer having a ring portion lying in a plane perpendicular to said center axis and having a plurality of tongues extending radially inward from said ring portion and axially outward from the plane, said tongues having distal ends engaged by said barb on said stem, said washer having a rounded outside circumference for slidably contacting said interior surface.

12. The voice communication headset recited in claim 10, wherein said stem comprises a bore therethrough allowing conductors to pass from said receiver cup through said stem into said housing.

13. A voice communication headset comprising:

a generally U-shaped, resilient head band having a first end and a second end;

a housing attached to said first end of said head band, said housing including a pair of opposed side walls and wherein a concave surface is formed in one side wall thereof, said concave surface projecting inwardly towards the other side wall, said concave surface including outwardly projecting pads, said housing further including a stem fixedly attached thereto and projecting outwardly from said concave spherical surface;

a receiver assembly, including a transducer for converting electrical signals into audible sound waves, pivotally mounted to said housing with a ball and socket type joint, said joint allowing axial rotation and spherical pivoting of said receiver assembly with respect to said housing, said receiver assembly further including a receiver cup having an outermost wall rear wall, said rear wall including an outwardly projecting convex spherical mating surface, said convex spherical mating surface including an aperture for receiving the stem of said housing, with dimensions of the aperture being larger than the cross-sectional dimensions of the stem, said convex spherical mating surface further including at least one longitudinal rib formed thereon for limiting the axial rotation of the receiver cup by contacting said projecting pads of said concave spherical surface; and a retainer attached to a distal end of said stem, wherein said retainer is larger than the aperture and slidably contacts the inner spherical surface of said receiver cup for maintaining said convex spherical mating surface substantially in contact with said concave surface of said housing while allowing relative sliding motion therebetween.

* * * * *